UNITED STATES PATENT OFFICE.

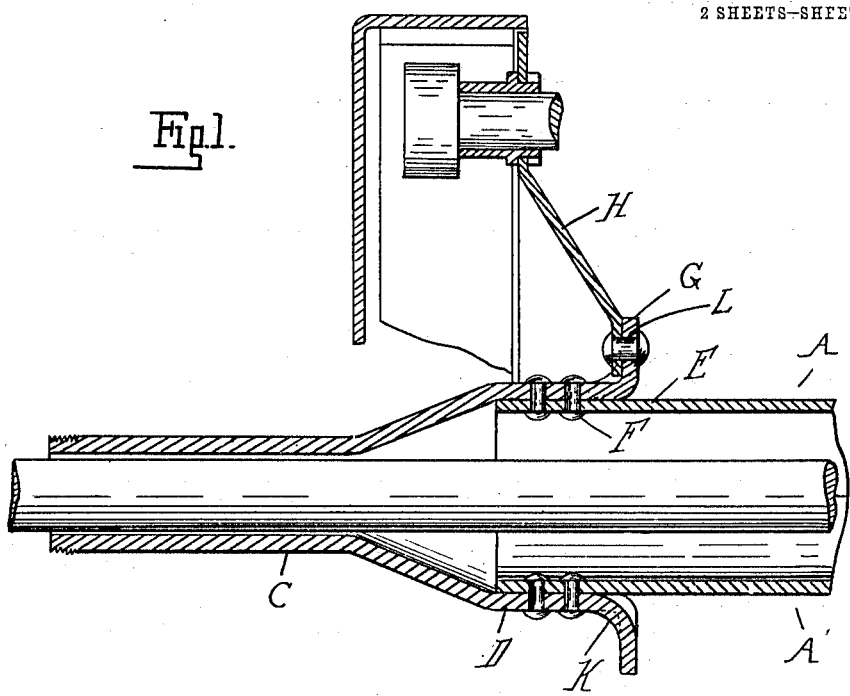
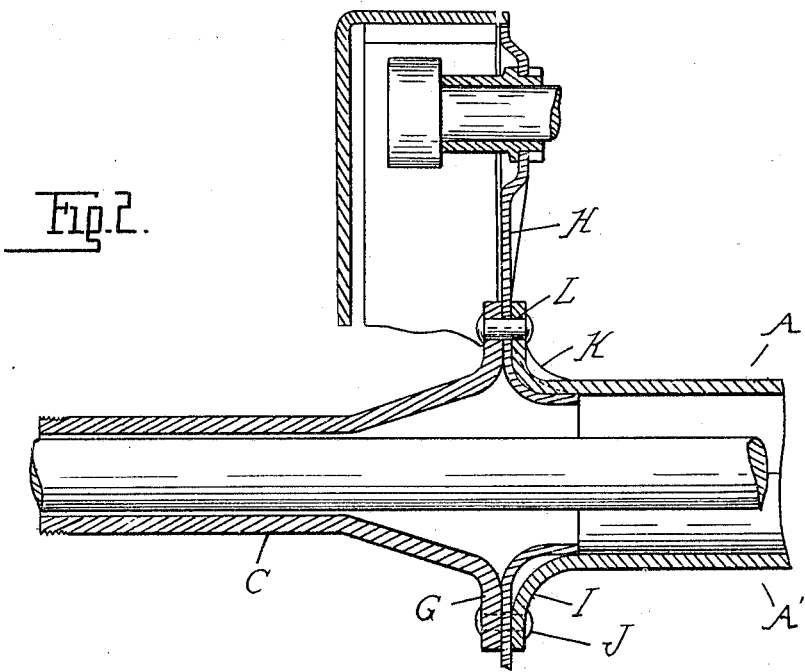

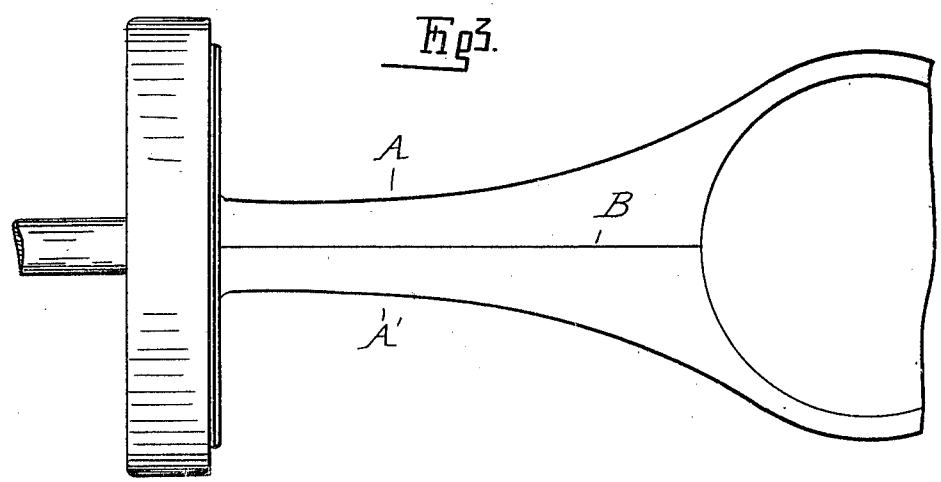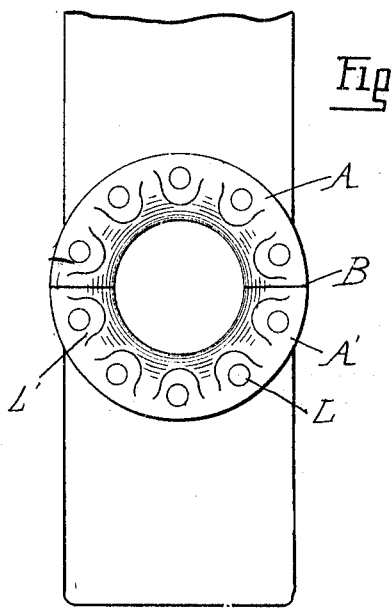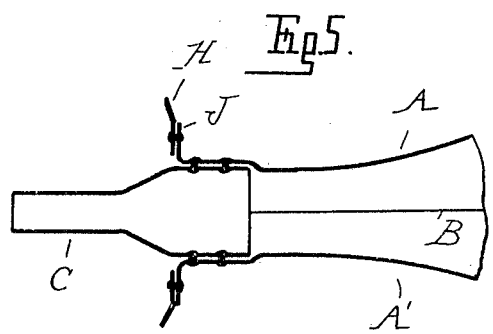

CECIL HAMELIN TAYLOR, OF DETROIT, MICHIGAN, ASSIGNOR TO CHALMERS-DETROIT MOTOR COMPANY, OF DETROIT, MICHIGAN, A CORPORATION OF MICHIGAN.

VEHICLE-AXLE.

1,048,230.   Specification of Letters Patent.   Patented Dec. 24, 1912.

Application filed December 17, 1909. Serial No. 533,567.

*To all whom it may concern:*

Be it known that I, CECIL HAMELIN TAYLOR, a citizen of the United States of America, residing at Detroit, in the county of Wayne and State of Michigan, have invented certain new and useful Improvements in Vehicle-Axles, of which the following is a specification, reference being had therein to the accompanying drawings.

The invention relates to vehicle axles and more particularly to that type of hollow or tubular axles formed from sheet metal and used in the construction of automobiles. It is usual with such constructions of axles to form a wheel mounting at the outer end, and adjacent to this wheel mounting to provide a mounting for the brake mechanism, which engages the brake drum on the wheel. The wheel bearing, which is of lesser diameter than the body portion of the axle, should be made of heavier stock to secure the proper relative strength, and where the axle is formed from an integral blank of sheet metal, the thickness of the material in all portions is necessarily substantially the same. Furthermore, to provide an accurately fitting bearing for the wheel, it is necessary to machine that portion of the axle, which results in still further reducing the thickness of the material at this point.

It is the primary object of the invention to obtain a construction in which the desired strength and thickness of metal in the wheel bearing portion may be obtained without unnecessarily increasing the strength and weight of the body portion.

It is a further object to provide a simple and convenient construction for mounting the brake mechanism upon the axle. This is accomplished—first, by forming the central portion and wheel bearing portion of the axle of separate blanks formed to engage each other; further, in the construction of means for attaching the brake mechanism; and, further, in various specific features as hereinafter set forth.

In the drawings—Figure 1 is a longitudinal section through a portion of the axle; Fig. 2 is a similar view of a modified construction; Fig. 3 is an elevation of the construction shown in Fig. 1; Fig. 4 is an end elevation of the construction of the body portion shown in Fig. 2 with the axle bearing section removed, looking toward the right; and Fig. 5 is a diagram of another modification.

The central or body portion of the axle is preferably formed of two like members, A and A′, having their edges homogeneously welded together along the line B to form in effect an integral structure. This central portion is of larger diameter than the ends of the axle and it is fashioned so as to secure the greatest strength, so that a comparatively light gage of sheet metal may be employed.

C is the axle bearing section, which is preferably formed of a seamless drawn tubular blank, having at its inner end a portion for engaging the end of the body portion A, A′ and also provided with a flanged portion for securing the brake-supporting head. As shown, in Fig. 1, the member C is formed with an enlarged tubular portion D for telescopically engaging a tubular end portion E of the member A, A′. The two members are then secured to each other, as by rivets F, or in any other suitable manner, and an outwardly-projecting annular flange G on the member C forms the means for mounting the brake head H.

In the construction shown in Fig. 2, both the member C and the member A, A′ are provided with outwardly extending flanges G and I, which are riveted together at J, and clamped between them is the web of the brake head H. With both constructions, the member C may be formed of much heavier material than the member A, A′, which permits of taking a true up-cut over the outer surface and still retains a greater thickness of the metal than in the body portion of the axle.

The primary advantage of the construction is that the relative gage of the metal in the body and the wheel bearing sections may be properly proportioned. A further advantage is that the same body section may be assembled with various constructions or sizes of wheel bearing portions according to the requirements of the particular vehicles on which the axles are to be used.

To stiffen and strengthen the construction of the flanges G and I, the metal is preferably corrugated or embossed so as to form a trussing effect. As shown, these flanges are formed with curved fillets K of comparatively large radius and extending preferably from the center of the rivet hole in the flange at L to form a flattened facing L' for bearing against the corresponding part of the adjacent flange.

What I claim as my invention is:

The combination with an axle, comprising a hollow body portion having an outwardly-turned annular flange at its outer end, and a hollow wheel-supporting member having an outwardly turned annular flange at its inner end adapted to be secured to the flange of said body portion, of a brake-supporting member secured between the flanges of said body portion and wheel-supporting member.

In testimony whereof I affix my signature in presence of two witnesses.

CECIL HAMELIN TAYLOR.

Witnesses:
  NELLIE KINSELLA,
  W. J. BELKNAP.